(12) United States Patent
Hunter (10) Patent No.: US 8,271,575 B2
(45) Date of Patent: Sep. 18, 2012

(54) INTERACTION AMONG ITEMS CONNECTED TO A NETWORK

(75) Inventor: Jim Hunter, San Jose, CA (US)

(73) Assignee: 4HomeMedia, Inc., Sunnyvale, CA (US)

( * ) Notice: Subject to any disclaimer, the term of this patent is extended or adjusted under 35 U.S.C. 154(b) by 658 days.

(21) Appl. No.: 12/047,191

(22) Filed: Mar. 12, 2008

(65) Prior Publication Data

US 2009/0234923 A1     Sep. 17, 2009

(51) Int. Cl.
*G06F 15/16* (2006.01)
(52) U.S. Cl. ........ 709/201; 709/204; 709/205; 709/206; 709/224; 709/225; 725/38; 725/62; 725/97; 725/117; 370/351
(58) Field of Classification Search ............... 709/201, 709/204, 205, 206, 224, 225
See application file for complete search history.

(56) References Cited

U.S. PATENT DOCUMENTS

| | | | |
|---|---|---|---|
| 6,286,031 B1* | 9/2001 | Waese et al. | 709/203 |
| 7,344,084 B2* | 3/2008 | DaCosta | 235/472.01 |
| 7,401,148 B2* | 7/2008 | Lewis | 709/228 |
| 7,831,240 B2* | 11/2010 | Patron et al. | 455/412.1 |
| 2003/0169289 A1 | 9/2003 | Holt et al. | |
| 2004/0237104 A1* | 11/2004 | Cooper et al. | 725/38 |
| 2005/0053050 A1* | 3/2005 | Ballinger et al. | 370/351 |
| 2005/0114891 A1* | 5/2005 | Wasenius | 725/62 |
| 2005/0216942 A1* | 9/2005 | Barton | 725/97 |
| 2005/0281185 A1* | 12/2005 | Kawasaki | 369/275.3 |
| 2006/0030297 A1* | 2/2006 | Coble et al. | 455/412.1 |
| 2006/0074810 A1* | 4/2006 | Verberkt et al. | 705/57 |
| 2006/0095402 A1* | 5/2006 | Lee et al. | 707/1 |
| 2006/0173959 A1* | 8/2006 | McKelvie et al. | 709/204 |
| 2007/0124775 A1* | 5/2007 | DaCosta | 725/62 |
| 2007/0136778 A1* | 6/2007 | Birger et al. | 725/117 |
| 2007/0157234 A1* | 7/2007 | Walker | 725/38 |
| 2008/0140789 A1* | 6/2008 | Mulligan et al. | 709/206 |
| 2008/0301732 A1* | 12/2008 | Archer et al. | 725/40 |
| 2009/0215477 A1* | 8/2009 | Lee et al. | 455/466 |
| 2009/0307370 A1* | 12/2009 | Boerries et al. | 709/232 |

* cited by examiner

*Primary Examiner* — Backhean Tiv
(74) *Attorney, Agent, or Firm* — Susan R. Payne (57) ABSTRACT

Particular embodiments provide interaction between items in a network. For example, lists of content may be shared between items connected through a network. A user may use a first item to select a second item in which content should be outputted. Instead of sending the content to the second item, the first item may generate and send a list of content to the second item instead of the content. A messaging infrastructure is used to allow the items to communicate the list of content between each other. The second item can then process the list and then determine how to access the item. This allows two different items to share content without the transfer of content between them. In another example, an item may be used to interact with a user interface of a second item. For example, an input device on a first item is used to provide input to a second item.

16 Claims, 6 Drawing Sheets

```
<fcml to="vns@d156" from="ui35@d156">
  <den_tv_mediachannel.set>
    <song name="Born in the USA"
     artist="Bruce Springsteen"
     url="http://192.168.1.101/mnt/usb1/bruce_springsteen/born_in_the_usa.mp3"/>
    <song name="Low"
     artist="Flo Rida"
     url="http://www.musiclocker.com/jhunter/flo_rida/low.mp3"/>
    <song name="Rockstar"
     artist="Nickleback"
     url="http://musicondemand.com/128574a39f32.mp3"/>
  </den_tv_mediachannel.set>
</fcml>
```

*Fig. 5A*

```
<fcml to="vns@d156">
  <den_tv_mediachannel.is>
    <song name="Born in the USA"
     artist="Bruce Springsteen"
     url="http://192.168.1.101/mnt/usb1/bruce_springsteen/born_in_the_usa.mp3"/>
    <song name="Low"
     artist="Flo Rida"
     url="http://www.musiclocker.com/jhunter/flo_rida/low.mp3"/>
    <song name="Rockstar"
     artist="Nickleback"
     url="http://musicondemand.com/128574a39f32.mp3"/>
  </den_tv_mediachannel.is>
</fcml>
```

```
<fcml to="ui*@d156" from="ui35@d156">
  <den_tv_control.is key="movie"/>
</fcml>

<fcml to="ui*@d156" from="ui35@d156">
  <den_tv_remote_ui.is>
    <title name="Share with"/>
    <button name="jim" cmd="movie"/>
    <button name="jake" cmd="68"/>
    <button name="Brian" cmd="69"/>
  </den_tv_remote_ui.is>
</fcml>
```

INTERACTION AMONG ITEMS CONNECTED TO A NETWORK

BACKGROUND

Particular embodiments generally relate to interactive control of devices over networks.

Many different items may be controlled automatically. The automation of control allows different items to be controlled using a portal. For example, many different functions for items in a household may be controlled, such as lights may be turned on and off automatically, etc. The items are typically controlled individually. Also, a user may control a television using the portal. The individual control of items is convenient for a user, but limits the user to interacting with just that device through the portal.

SUMMARY

Particular embodiments provide interaction between items in a network. For example, lists of content may be shared between items connected through a network. A user may use a first item to select a second item in which content should be outputted. Instead of sending the content to the second item, the first item may generate and send a list of content to the second item. A messaging infrastructure is used to allow the items to communicate the list of content between each other. The second item can then process the list and then determine how to access the item. This allows two different items to share content without the transfer of content between them.

In another example, an item may be used to interact with a user interface of a second item. For example, an input device on a first item is used to provide input to a second item. The function of the input may be provided to the second item even if the second item is not configured to receive input from the input device. For example, a keyboard on a cell phone may be used to input a text string into an interface of a television even though the television is not configured to receive input from a cell phone keyboard. The messaging infrastructure allows the interaction between the two items and allows more powerful uses of a user interface of the second item.

A further understanding of the nature and the advantages of particular embodiments disclosed herein may be realized by reference of the remaining portions of the specification and the attached drawings.

DETAILED DESCRIPTION OF EMBODIMENTS

Figure 1:
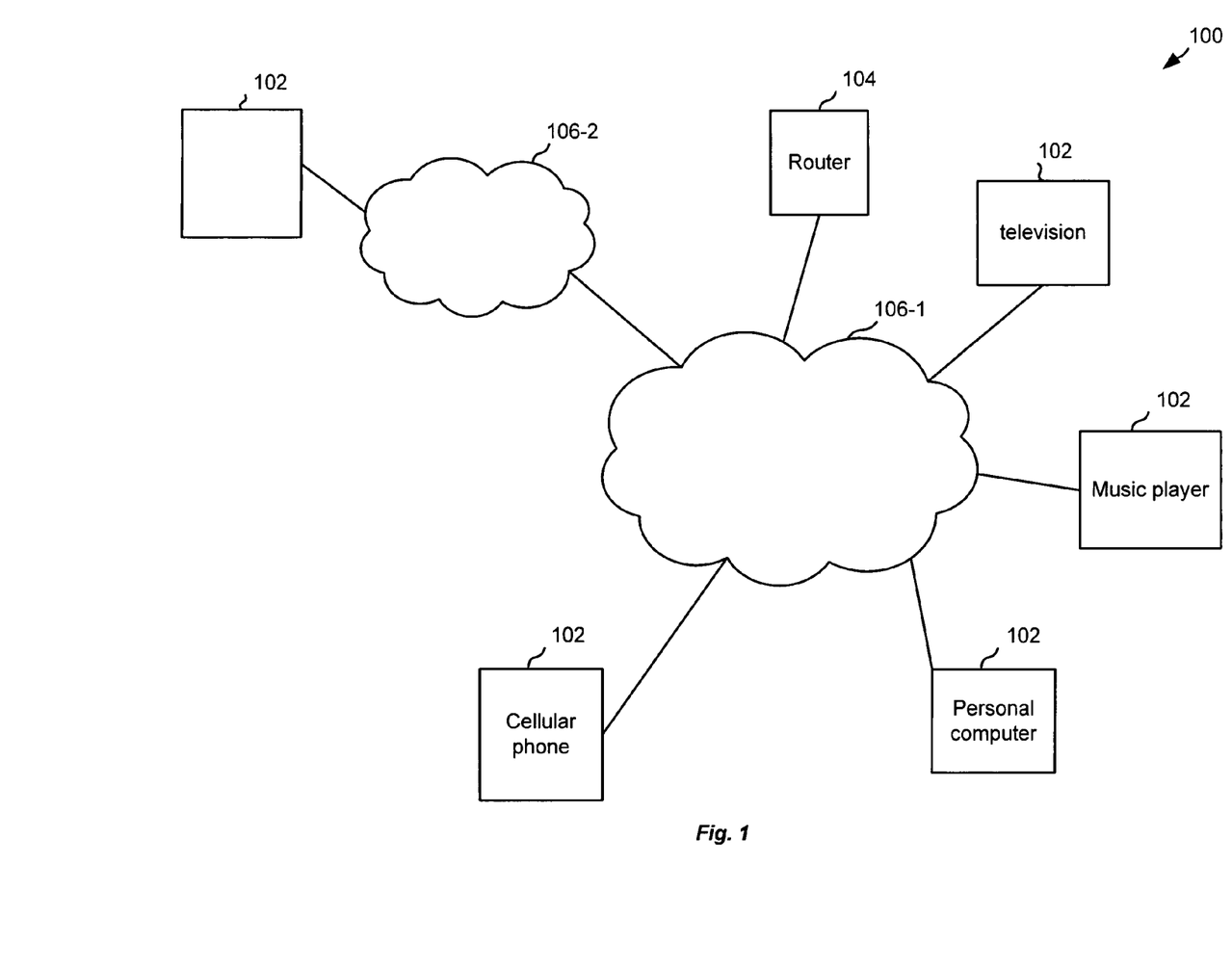
FIG. 1 shows an example of a system according to one embodiment.

FIG. 1 shows an example of a system 100 according to one embodiment. System 100 includes items 102, router 104, and networks 106. Other items may also be appreciated.

Items 102 may include physical and virtual items. The items may include devices, such as lights, televisions, personal computers, mobile telephones, set top boxes, DVD players, etc. Virtual items may also include software modules, media players in a personal computer or other virtual devices. An item may be an entity that can interact with other items.

Items 102 may include screens or displays. The screens are used to provide interaction between items 102. For example, a list of content may be shared between screens of items 102. Also, interaction between input devices from an item 102 to a screen of another item 102 may be performed.

Router 104 may include a wireless router, a wired router, or any other data forwarding device, such as a switch. Router 104 may provide a home network 106 in which items 102 can communicate among each other.

Network 106 may include a local area network (LAN). In one example, network 106 includes a wired local area network or a wireless local area network. Network 106 may also include a wide area network (WAN). For example, items 102 may be attached through WAN 106-2 and communicate with items 102 attached to LAN 106-1.

Items 102 may be different items that may not have been configured by their manufacturer's to communicate among each other. For example, a television may not be configured to communicate with a cellular phone, and vice versa. The television as configured by the manufacturer is not configured with an interface to communicate with a cellular phone of a different manufacturer. However, particular embodiments provide a messaging infrastructure in which items 102 may interact. The infrastructure allows a user to control any user interface of items 102 connected to network 106. Thus, different combinations of items 102 may interact with other items 102. The messaging infrastructure allows items 102 to interact with other items 102 to have actions performed without being configured to understand how the other items 102 perform the actions. Accordingly, a cellular phone may interact with a set-top box of a television, a remote control for the television can interact with a music player, etc.

Figure 2:
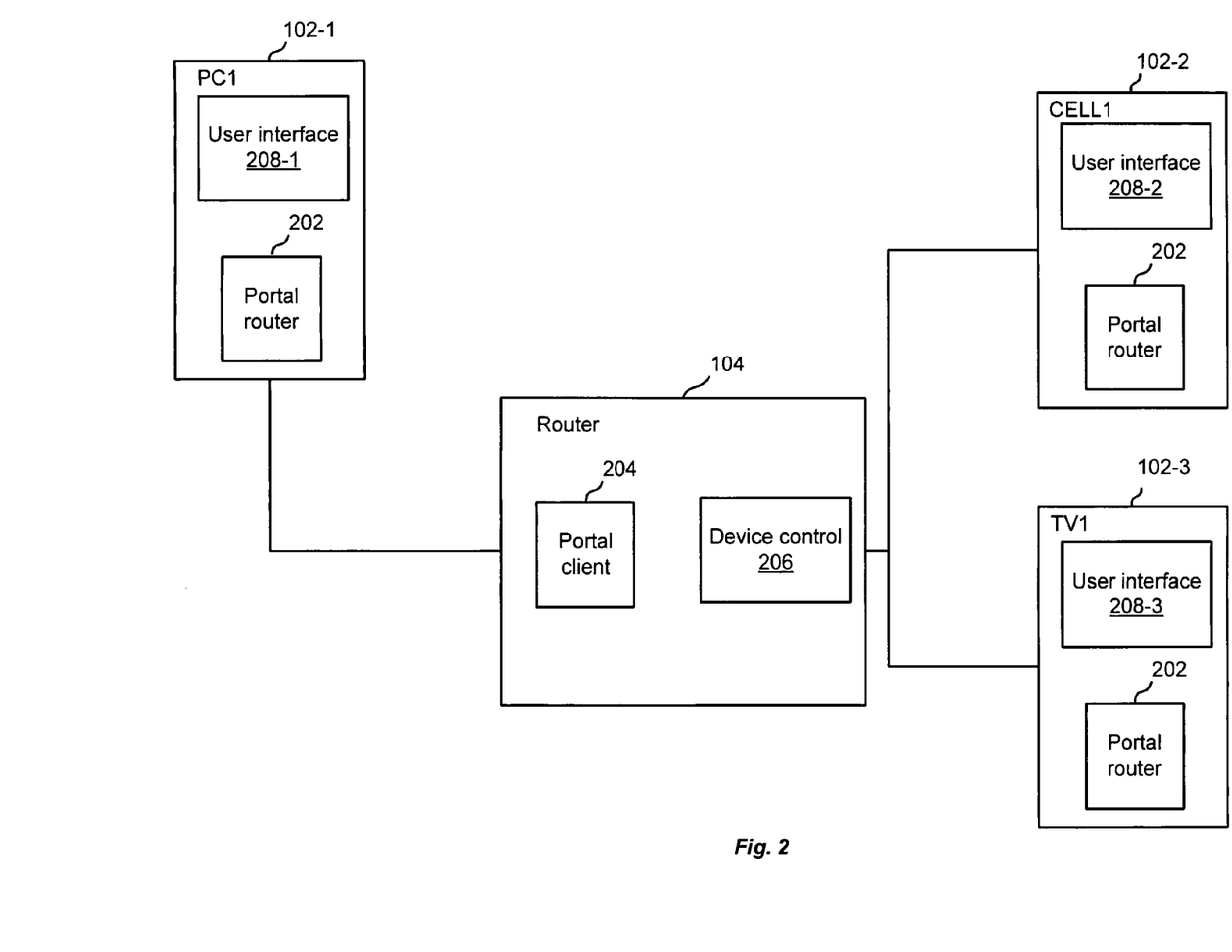
FIG. 2 shows a more detailed example of the system according to one embodiment.

FIG. 2 shows a more detailed example of system 100 according to one embodiment. Item 102-1 may be a personal computer and may be used to interact with items 102-2 and/or 102-3. User interface 208-1 may be used to control other items 102. Items 102-2 and 102-3 may be a television and a cellular phone in this example.

The messaging infrastructure includes a common language such that all items 102 can communicate among each other. Router 104 may be used to route messages between items 102. Although router 104 is provided, it will be understood that items 102 may communicate peer to peer.

Item identifiers may be used to identify items 102. For example, when items 102 are discovered on the network 106, an identifier may be assigned. Different unique identifiers may be assigned per item 102. This allows items 102 to determine the senders and recipients of messages. As shown, the personal computer is identified as PC1, the cellular phone is identified as CELL1, and the television is identified as TV1. Items 102 are uniquely identified even if they are of the same type, such as multiple cellular phones in a network are uniquely identified.

A portal router 202 is configured to generate a message to interact with an item 102. For example, a user may use interface 208 to input a desired action. The action may be to send a list of content to item 102-2 or to interact with user interface 208-2 of item 102-2. After receiving input, portal router 202 may generate the message. The message may include the identifiers for item 102-1 (the sender) and item 102-2 (the recipient). The message may include an object to be controlled. For example, the object to be controlled may include any function of items 102-2 or 102-3. The object may be used to provide a list of content or to interact with user interface 208-2 of item 102-2. The object may be generic, such as a title of a song or link to a song. Item 102-1 does not need to know how item 102-2 will play the song. Rather, item 102-2 receives the object specifying the song title, and then determines how to play the song. This allows different items to control other items without knowing how the other item will play the song.

The message is sent to router 104, which receives it at portal client 204. Portal client 204 is configured to parse the message and determine how to route the message. For example, device control 206 may broadcast a message through network 106-1 such that all items 102 can receive the message. In this case, the intended recipient of the message can parse the destination identifier to determine that the message is intended for it. For example, the recipient identifier included CELL1, and thus item 102-2 processes the message but item 102-3 does not process it. However, device control 206 may also direct the message to just item 102-2. Also, items 102 may subscribe to groups and receive updates to groups.

By providing an infrastructure for items 102 to communicate, different items 102 may control other items 102 even though they may not have been configured to interact by the manufacturer. The common language that is used may be provided to allow items 102 to interact with other items 102 to provide different interactions, such as sharing content or sharing input functions. These interactions will be described in more detail below.

Figure 3:
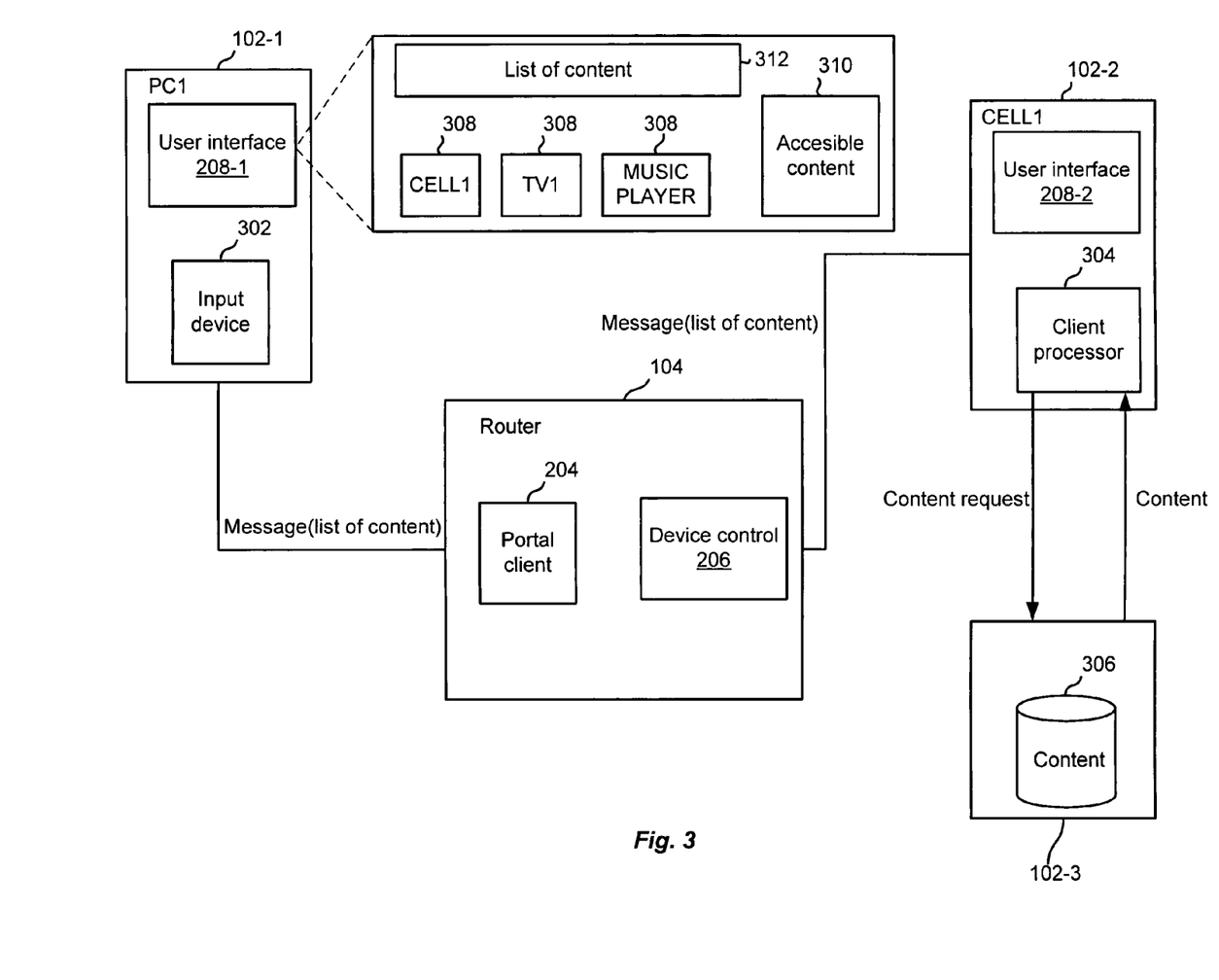
FIG. 3 shows an example of the interaction of items to share a list of content according to one embodiment.

FIG. 3 shows an example of the interaction of items to share a list of content according to one embodiment. A user may use item 102-1 to send a list of content with item 102-2. The list of content may include any content that a user wants to share with item 102-2.

Input device 302 may be any input device, such as a keyboard, touch screen, interactive voice response system, etc. Input device 302 may receive input from a user. For example, user interface 208-1 may be controlled using input device 302. The screen may include navigation remote controls that a user can browse, search, and select content. The content may be connected to network 106, such as it may be stored in storage 306. In one example, the storage may be separate from item 102-2. For example, the content may be stored in another item, such as item 102-3 or in a separate storage device. Also, the content may reside on item 102-2.

A user may select an item from user interface 208-1 and also the list of content. A more detailed view of user interface 208-1 is shown in FIG. 3. Buttons 308 can be selected to input a destination for a message. For example, if the list of content should be outputted on the cellular phone, CELL1, then the button for CELL1 is selected. Accessible content 310 may list content that is accessible on network 106. As content is selected by a user, a list of content may be displayed in list of content 312. The list of content may include an identifier for each content unit. However, the list of content does not include the content itself. For example, a list of songs, movies, videos, etc. may be selected. User interface 208-1 may be similar for all items 102. For example, users may use similar interfaces to select content and send lists of content to any devices listed on buttons 308.

Item 102 then generates a message that includes the list of content. For example, identifiers for item 102-1 and item 102-2 included in a message along with an object that includes the list of content. The same objects may be sent in a message to different items 102. Thus, the list of content is generic and can be interpreted by multiple items 102.

The object may include more information that may be used to access the content. For example, the start and stop times for the content, the play list order, the index for playback within the list, the source of the content or other attributes may be provided.

Figure 5A:
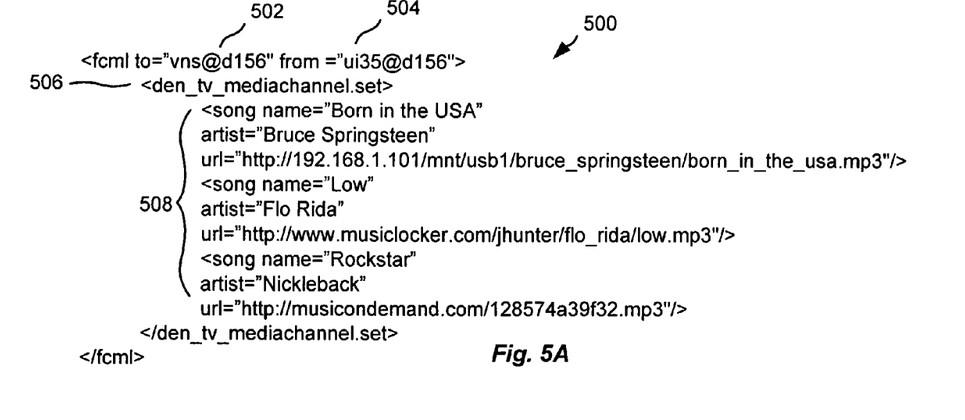
FIGS. 5A and 5B depict example messages according to one embodiment.

The message that is sent uses the message format in the messaging infrastructure. FIGS. 5A and 5B depict example messages according to one embodiment. In a message 500 in FIG. 5A, the item identifiers 504 and 502 indicate the sender and intended recipient of the message, respectively. Also, an object section 506 includes a group identifier. The group identifier indicates groups or virtual objects that items 102 can subscribe to. When a group changes, all subscribers can be notified through messages regarding the change. Objects 508 include a list of content. The list of content may identify which content should be output on item 102-2. The list does not indicate how the content should be output. The message may be sent to router 104, which may act as a central event store. For example, messages are sent to router 104, which stores the messages and generates events. The events are stored and actions are performed for the events. For example, messages may be broadcast to other items 102 in response to receiving message 500.

Figure 5B:
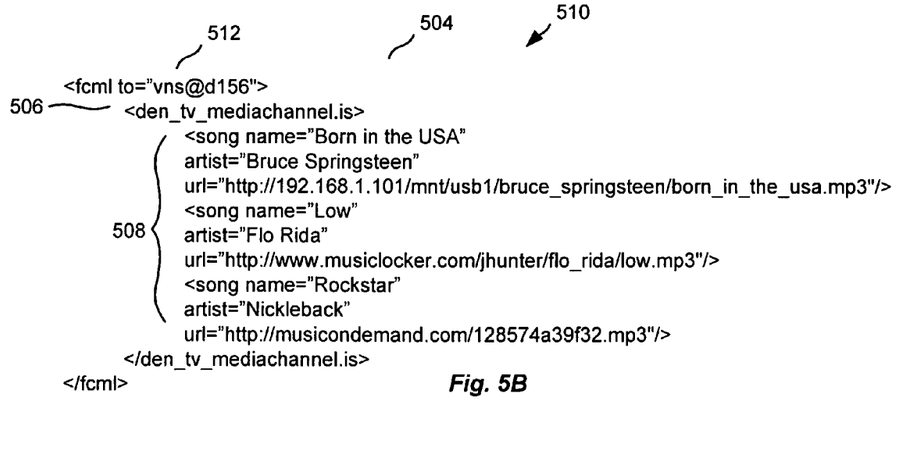

FIG. 5B depicts an example message 510 that can be sent according to one embodiment. Router 104 may generate message 510 in response to received message 500. A destination field 512 is an identifier that items 102 can use to determine if message 510 should be processed. For example, items 102 that are interested in or subscribed to "vns@d156" receive and process message 510. In one embodiment, message 510 is broadcast to all items 102 and only items 102 interested in the message process it. Also, router 104 may determine items 102 that subscribed to the group and sends message 510 to those items 102.

Also, when the intended recipient of the message is selected from a list, that list can be minimized by determining capability of recipients using parameters provided by item 102-2, and exclude items from the list of possible recipients if they do not support the particular media type (for example, a music only player has no use for still images). Also, items 102 can exclude content that it cannot output. Thus, item 102-1 does not need to know the configuration of item 102-2 to cause it to output the content, but can limit the inclusion of 102-2 at the onset of selecting recipient if additional information is known.

Item 102-2 may then process the message using client processor 304. Client processor 304 parses the message and determines an action to perform. In this case, the object included in the message is a list of content. The same list of content in objects 508 may be sent to different items 102. Items 102 may process the list differently to output the content, however. By using the same list and message format, different items can be configured to interact. Client processor 304 can then determine how to access the content. Thus, the message is used to generically send the list. Item 102-2 can then determine how to access the content in the list.

In the messaging infrastructure, client processor 304 acts as a front end to user interfaces 208. Client processor 304 can interpret the messages and then item 102 can perform actions based on the messages. Thus, items 102 do not need to be configured to interact together. Rather, having them be compatible with the messaging infrastructure allows items to interact. Messages can be interpreted by client processors 204 and then items 102 determine actions to perform. How items perform actions is determined by each item 102 individually.

The content can be accessed over any common network. Client processor 304 can access the content in different ways. The message is a generic pointer to media, which means that client processor 304 can interpret the message information and determine how best to retrieve it. One example is that a transcode of the content is necessary, so client processor 304 requests the media, routing it through a transcoding service. One example is that generic descriptive parameters in the message are used to retrieve a different format of the same file. Because there is a central event store, all messages are broadcast immediately upon change, and all clients instantly respond as necessary.

Client processor 304 then formulates a content request and broadcasts the message to retrieve the content. For example, client processor 304 may determine the identifier for an item 102 that is storing the content. The content that is requested is also included in the message. This message may be broadcast over network 106. When an item 102 receives the message, it is configured to send the content to item 102-2. In other embodiments, the content may be stored on item 102-2 and it is output without sending a request.

In one example, the message may include a link that is used to determine where the content is stored. For example, the link may include a uniform resource locator (URL) that identifies where the content is located. Item 102-2 then uses the link to access the content.

After accessing the content, item 102-2 determines an output method to output the content. For example the output method may be specific to item 102-2. Item 102-1 does not need to know how item 102-2 will output the content. Also, the message sent to item 102-2 does not need to include information on how item 102-2 will output the content. Examples of output methods may include using drivers to output music through speakers, outputting a television show or song through a television screen, etc. Certain internal functions may be performed to output the information that may be different among items 102. For example, a music player may have different circuitry/software to output a song from a cellular phone's circuitry and software.

By sending lists of content between items 102 using the messaging infrastructure, different items 102 may interact to have content output. In some cases, item 102-1 may not be able to output the content but can control item 102-2 to have it output the content. Using the messaging infrastructure, items 102-1 does not need to know how item 102-2 will output the content. Rather, the message may be sent and item 102-2 can determine how to access and output the content. The messaging infrastructure, however, allows item 102-1 to communicate with item 102-2.

A screen-to-screen sharing is provided in that user interface 208-1 may be used to share a list of content with user interface 208-2. In this case, a list of content may be displayed on interface 208-2. The content may then be output.

The content may be shared in different ways. For example, rights may be defined for the list of content. Thus, different items 102 may receive the content but only certain users may be allowed to access the list. Other features are provided that allow customizing the order of playback and which items to playback in the list of content.

Figure 4:
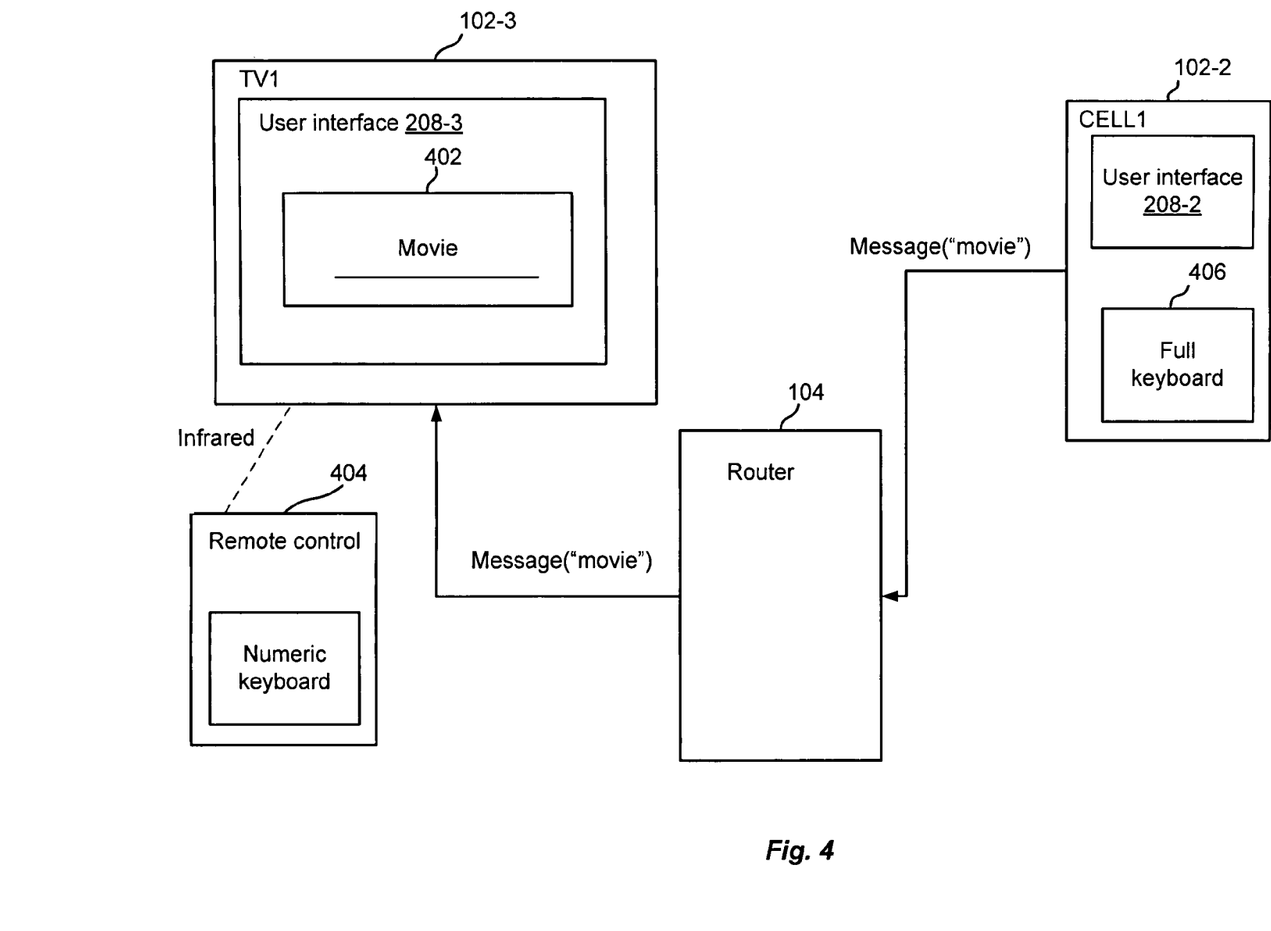
FIG. 4 depicts a more detailed example of a system in which an input function of a first item is used to input information on a second item according to one embodiment.

Another application includes the controlling of an item 102 using another item 102 according to one embodiment. FIG. 4 depicts a more detailed example of a system in which an input function of an item 102-2 is used to input information on an item 102-3 according to one embodiment.

In one example, an item 102-2 may include an input device 302 that provides a function. For example, a keyboard may be used to provide a text input.

An item 102-2 may include an interface 208-2. Item 102-3 may not normally receive text input from an input device from item 102-2. For example, a television does not receive text input from a cellular phone. Or, in other cases, an input device associated with item 102-3 may not provide the function in a convenient way. For example, the remote control 404 for a television does not provide a full text keyboard. Remote control 404 may only include a numeric keyboard and arrow buttons. To provide text input, a screen on television 102-3 may need to be navigated. However, a full keyboard 406 may be used to provide the input to user interface 208-2. The full keyboard may include alphanumeric keys (such as an individual key for the entire alphabet). This provides a convenient use of another item 102 to input information on a user interface 208 of another item. It also leverages functions of items that may be easier to use, or preferable to use, without requiring the devices to be pre-configured to function together.

A display item 402 may be displayed on interface 208-3. Input device 302 may be used to control display item 402. For example, input can be provided in display item 402 using keyboard 406.

The messaging infrastructure is used to allow interaction between item 102-2 and item 102-3. Although the keyboard for item 102-2 is not configured to directly communicate input to the television, the messaging infrastructure allows the input to be provided to the television. Normally, the television may be controlled by an infrared remote control 404. However, item 102-2 may communicate with item 102-3 through network 106.

Item 102-2 may connect with item 102-3 and the user indicates a desire to control item 102-3. This may be performed by sending a message that indicates a desire to control user interface 208-3. Text input may be received from input device 302. For example, a full keyboard may be used to type in a text message.

Additionally, as the user interface in Item 102-3 changes its focal position during navigation by any input, including item 102-2. Item 102-3 can send messages to connected items 102-2 that include user interface display elements specific to the context of item 102-2 focus.

Figure 6:
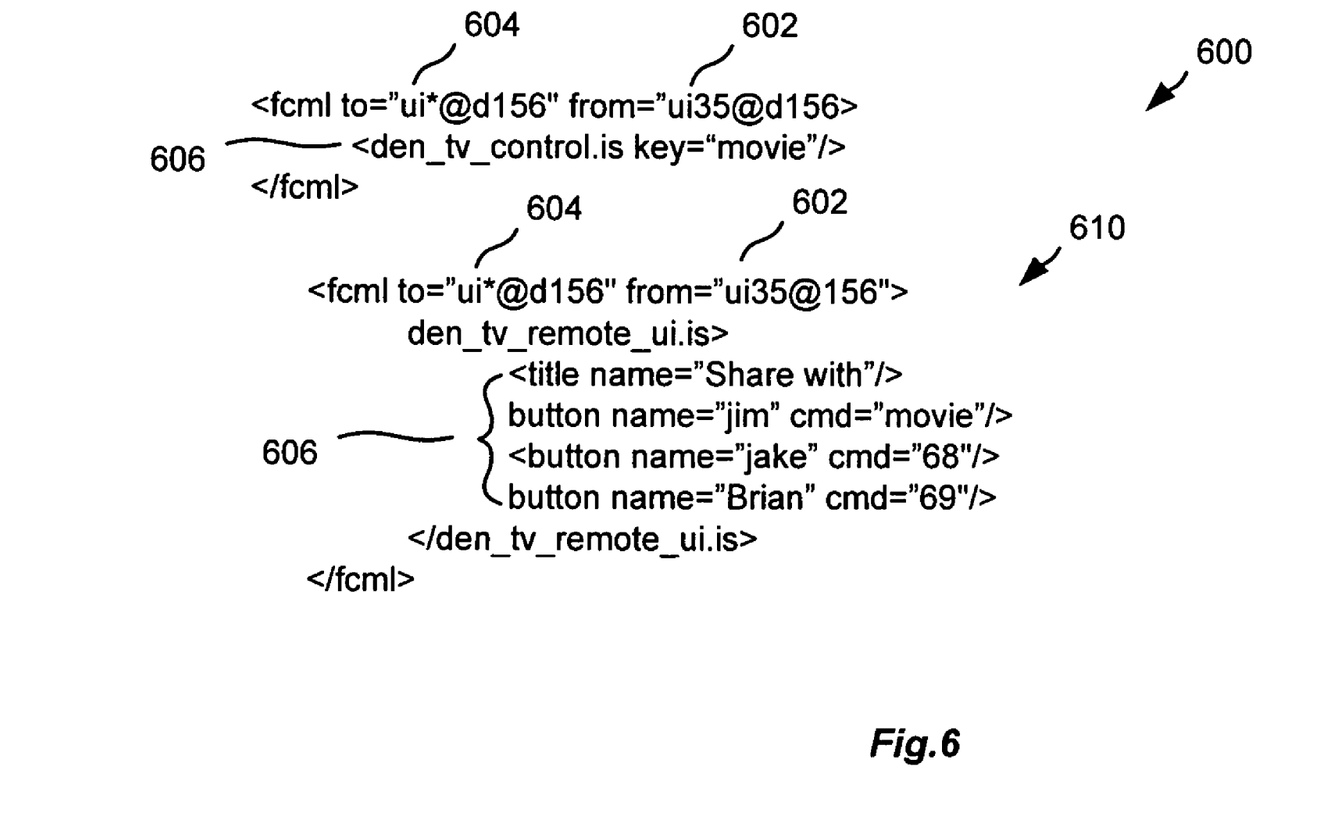
FIG. 6 depicts an example of another message according to one embodiment.

A message may be generated with the text message. The message may include the item identifiers for item 102-2 and item 102-3. Also, an object in the message may include the text message. FIG. 6 depicts examples of a message according to one embodiment.

Message 600 may be sent from item 102-2 to router 104. A sender field 602 and intended recipient field 604 indicate the sender and recipient. Also, an object field 606 indicates an object to be controlled. In this case, the object is a TV control and a value for input is "movie". The numbers "movie" may be been selected on item 102-2 and are sent in message 600. This message may be used to output "movie" on multiple interfaces of items 102.

The message may be sent through router 104, which then broadcasts it to item 102-3. Item 102-3 may then determine an output method specific to item 102-3 to output the information in the message. The output method may be specific to item 102-3. Item 102-2 does not need to know how item 102-3 will output the information in the display element. Also, the message sent to item 102-3 does not need to include information on how item 102-3 will output the information. Examples of output methods may include displaying the information in the text input box. Certain internal functions may be performed to output the information that may be different among items 102.

In one example, a user may control user interface 208-3 to bring up display item 402. Control may be focused on a text input box in display item 402 and the text message is input. The user may see the text message being input in the input box. As additional input is received at input device 302, additional messages may be sent. For example, an additional text message may be sent and displayed on display item 402.

The text may be used to perform a function on user interface 208-3. For example, a user may be searching for television shows and can use keyboard 302 to input the name of the television show. This provides a convenient interface for a user in that the keyboard for the telephone may be easier to use than the remote control for the television. This allows a user to use an input device of another item 102 to input information. The use is allowed because of the messaging infrastructure. The television display can come from any display capable box that can plug into the television, for example a set top box, or pass thru box that can communicate with the central event store.

Also, the telephone may communicate through network 106. This allows the telephone to communicate using methods that are different from input devices associated with item 102-3. For example, a remote control may communicate with item 102-3 using infrared. However, item 102-2 may not be configured to use infrared. However, using the messaging infrastructure, item 102-2 can communicate with item 102-3 over network 106 using another protocol. In one example, hypertext transfer protocol (HTTP) is used to communicate. This allows item 102-3 to be communicated with by any network-connected item 102.

User interface 208-3 may not be configured to interact directly with input device 302. For example, a manufacturer may have configured a remote control to interact with the television, and not a cellular phone from a different manufacturer. The messaging infrastructure is configured to allow the control of user interface 208-3. This is different from a remote user interface that may be provided to a device and is used to provide input to display 402. For example, the manufacturer may configure an interface to be accessed remotely. However, this requires pre-configured of the item to work with the interface and the interface is often proprietary and only works with the item. In contrast, the messaging infrastructure is used to control display item 402 without configuring input device 302 to provide the input to user interface 208-3. This allows multiple items 102 to interact with display item 402. Also, by sending messages through network 106, multiple items 102 can communicate with item 102-3. Previously, the input device to item 102-3 was limited to infrared or another communication method that the device was configured for.

In another example, message 610 depicts a message that can be sent using context from one user interface to another. The sender and recipient stay the same; however, the object control has been changed. In this case, the command "movie" is mapped to different commands on different items 102. For item 102-3, the command is "movie", for item 102-4, the command is "68", and for item 102-5, the command is "69". The numeric numbers may correspond to different commands that are compatible with the other items 102.

Accordingly, the messaging infrastructure allows different items 102 to interact with other items 102. Various applications, such as sending a list of content or to control another interface are provided.

Although the description has been described with respect to particular embodiments thereof, these particular embodiments are merely illustrative, and not restrictive. Although certain items are described, it will be understood that other items may be appreciated.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory. Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitude of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for processing messages at a second item using a messaging infrastructure, the method comprising:

receiving, at the second item, from a router, a message including an object field specifying an object that is associated with the second item to control and a list of content specified by a first item, wherein the object field is used to control a plurality of objects associated with the second item;

parsing, by the second item, the message to determine the list of content and an action to perform based on the object that is specified, the messaging infrastructure allowing the second item to receive and parse the message to determine the list of content and the action to perform without the second item being configured to communicate peer to peer with the first item;

determining capabilities of the second item;
determining at least a portion of content in the list of content to output based on a capability to output the at least a portion of the content;
determining a location of the at least a portion of the content;
determining, by the second item, an access method for accessing the at least a portion of the content based on an identifier for the content;
accessing, by the second item, the at least a portion of the content from the determined location;
determining, by the second item, an output method for the accessed content based on the determined action and a configuration of the second item, wherein the configuration of the second item includes configuration information specific to an interface of the second item and the capability to output the second item, and wherein the message in the messaging infrastructure does not include information on how to output the accessed content; and
outputting, by the second item, the accessed content based on the output method.

2. The method of claim 1, wherein accessing the at least a portion of the content comprises:
generating a request for the at least a portion of the content;
sending the request for the at least a portion of the content; and
receiving the at least a portion of the content in response to sending the request.

3. The method of claim 1, wherein the list of content comprises a link associated with the content.

4. The method of claim 1, wherein the second item is configured to output the accessed content using a different output method from the first item.

5. The method of claim 1, wherein the interface is specific to a user interface of the second item.

6. The method of claim 1, wherein a first input device for the first item is used to provide an input of the list of content, the first input device providing an input function not being provided by a second input device for the second item.

7. The method of claim 1, wherein determining the output method, accessing the content, and outputting the content is automatically performed by the second item upon receiving the message.

8. The method of claim 1, the method further comprising:
parsing the message to determine which object in the plurality of objects is specified, wherein the second item determines the output method from a plurality of output methods based on the object specified.

9. A method for routing messages from a first item to a second item using a messaging infrastructure, the method comprising:
receiving, at a router, a first message from the first item using the messaging infrastructure, the first message including an object field specifying an object associated with the second item to control and a list of content specified by the first item;
determining a second message using the messaging infrastructure, the second message including the object field specifying the object and the list of content, wherein the object field is used to control a plurality of objects associated with the second item; and
sending the second message to the second item, wherein the second message allows the second item to parse the message to determine an action to perform based on the object that is specified and the list of content, determine capabilities of the second item; determine at least a portion of content in the list of content to output based on a capability to output the at least a portion of the content, determine an access method for accessing the at least a portion of the content, and determine an output method for outputting the content based on the list of content, the action to perform and a configuration of the second item, wherein the configuration of the second item includes configuration information specific to an interface of the second item and the capability to output the second item, and wherein the second message in the messaging infrastructure does not include information on how to output the accessed content,
wherein the messaging infrastructure allows the router to send the second message to the second item for parsing to determine the list of content and the action to perform without the second item being configured to communicate peer to peer with the first item.

10. The method of claim 9, further comprising:
analyzing the first message to determine a destination of the second item; and generating an event to trigger sending the second message to the second item.

11. The method of claim 9, further comprising broadcasting the second message to a plurality of items including the second item.

12. A non-transitory computer-readable storage medium containing instructions for controlling a computer system to perform a method for processing messages at a second item using a messaging infrastructure, the method comprising:
receiving, at the second item, from a router, a message including an object field specifying an object that is associated with the second item to control and a list of content specified by a first item, wherein the object field is used to control a plurality of objects associated with the second item;
parsing, by the second item, the message to determine the list of content and an action to perform based on the object that is specified, the messaging infrastructure allowing the second item to receive and parse the message to determine the list of content and the action to perform without the second item being configured to communicate peer to peer with the first item;
determining capabilities of the second item;
determining at least a portion of content in the list of content to output based on a capability to output the at least a portion of the content;
determining a location of the at least a portion of the content;
determining, by the second item, an access method for accessing the at least a portion of the content based on an identifier for the content;
accessing, by the second item, the at least a portion of the content from the determined location;
determining, by the second item, an output method for the accessed content based on the determined action and a configuration of the second item, wherein the configuration of the second item includes configuration information specific to an interface of the second item and the capability to output the second item, and wherein the message in the messaging infrastructure does not include information on how to output the accessed content; and
outputting, by the second item, the accessed content based on the output method.

13. The non-transitory computer-readable storage medium of claim 12, wherein accessing the at least a portion of the content comprises:

generating a request for the at least a portion of the content;

sending the request for the at least a portion of the content; and receiving the at least a portion of the content in response to sending the request.

14. The non-transitory computer-readable storage medium of claim 12, wherein the list of content comprises a link associated with the content.

15. The non-transitory computer-readable storage medium of claim 12, wherein the second item is configured to output the accessed content using a different output method from the first item.

16. The non-transitory computer-readable storage medium of claim 12, wherein the interface is specific to a user interface of the second item.

* * * * *